United States Patent
Qin et al.

(10) Patent No.: US 11,634,146 B2
(45) Date of Patent: Apr. 25, 2023

(54) METHOD AND SYSTEM FOR INTEGRATED PATH PLANNING AND PATH TRACKING CONTROL OF AUTONOMOUS VEHICLE

(71) Applicant: Beijing Institute Of Technology, Beijing (CN)

(72) Inventors: Yechen Qin, Beijing (CN); Yiwei Huang, Beijing (CN); Ehsan Hashemi, Edmonton (CA); Amir Khajepour, Waterloo (CA); Zhenfeng Wang, Beijing (CN)

(73) Assignee: Beijing Institute Of Technology

( * ) Notice: Subject to any disclaimer, the term of this patent is extended or adjusted under 35 U.S.C. 154(b) by 0 days.

(21) Appl. No.: 17/777,896

(22) PCT Filed: May 28, 2021

(86) PCT No.: PCT/CN2021/096615
§ 371 (c)(1),
(2) Date: May 18, 2022

(87) PCT Pub. No.: WO2022/062452
PCT Pub. Date: Mar. 31, 2022

(65) Prior Publication Data
US 2022/0410910 A1    Dec. 29, 2022

(30) Foreign Application Priority Data
Sep. 23, 2020 (CN) .......................... 202011009697.0

(51) Int. Cl.
*B60W 50/00* (2006.01)
*G05B 13/04* (2006.01)
*B60W 60/00* (2020.01)

(52) U.S. Cl.
CPC .... *B60W 50/0097* (2013.01); *B60W 60/0015* (2020.02); *G05B 13/048* (2013.01);
(Continued)

(58) Field of Classification Search
CPC ......... B60W 50/0097; B60W 60/0015; B60W 2754/30; B60W 2050/0022;
(Continued)

(56) References Cited

U.S. PATENT DOCUMENTS 9,469,296 B2    10/2016  Nilsson et al.
11,526,997 B2 * 12/2022 Sibley .................... A01C 15/00
(Continued)

FOREIGN PATENT DOCUMENTS

CN    101726296 A    6/2010
CN    107878453 A    4/2018
(Continued)

OTHER PUBLICATIONS

International Search Report for Application No. PCT/CN2021/096615 dated Aug. 27, 2021, 3 pgs.
(Continued)

*Primary Examiner* — Peter D Nolan
*Assistant Examiner* — Wae L Louie
(74) *Attorney, Agent, or Firm* — Lerner David LLP (57) ABSTRACT

The present disclosure relates to a method and system for integrated path planning and path tracking control of an autonomous vehicle. The method includes: obtaining five input control variables and eleven system state variables of an autonomous vehicle at current time; constructing a vehicle path planning-tracking integrated state model according to the obtained variables at the current time; enveloping external contours of two autonomous vehicles using elliptical envelope curves to determine elliptical vehicle envelope curves of the two autonomous vehicles, respectively; determining time to collision (TTC) between the vehicles according to elliptical vehicle envelope curves and vehicle driving states; establishing an objective function of a model prediction controller (MPC) according to the
(Continued)

model; and solving the objective function based on the TTC, and determining input control variables to the MPC at the next time. Autonomous vehicle collision avoidance can be achieved according to the present disclosure.

10 Claims, 3 Drawing Sheets

(52) U.S. Cl.
CPC ............... *B60W 2050/0022* (2013.01); *B60W 2050/0031* (2013.01); *B60W 2510/20* (2013.01); *B60W 2520/06* (2013.01); *B60W 2520/12* (2013.01); *B60W 2520/14* (2013.01); *B60W 2520/20* (2013.01); *B60W 2520/28* (2013.01); *B60W 2520/30* (2013.01); *B60W 2754/30* (2020.02)

(58) Field of Classification Search
CPC ..... B60W 2050/0031; B60W 2510/20; B60W 2520/06; B60W 2520/12; B60W 2520/14; B60W 2520/20; B60W 2520/28; B60W 2520/30; G05B 13/048
See application file for complete search history.

(56) References Cited

U.S. PATENT DOCUMENTS

| | | | |
|---|---|---|---|
| 2003/0191572 A1 | 10/2003 | Roll et al. | |
| 2017/0031361 A1* | 2/2017 | Olson | B60W 30/0956 |
| 2019/0100211 A1* | 4/2019 | Liu | B60W 10/20 |
| 2019/0389459 A1* | 12/2019 | Berntorp | B60W 30/18163 |
| 2020/0159216 A1* | 5/2020 | Le | B60W 60/001 |
| 2020/0180612 A1* | 6/2020 | Finelt | G06V 20/58 |
| 2021/0380099 A1* | 12/2021 | Lee | G08G 1/167 |
| 2022/0324266 A1* | 10/2022 | Alghooneh | B60C 11/246 |

FOREIGN PATENT DOCUMENTS

| | | |
|---|---|---|
| CN | 107885932 A | 4/2018 |
| CN | 109683619 A | 4/2019 |
| CN | 109795502 A | 5/2019 |
| DE | 102015204214 A1 | 11/2016 |
| GN | 106564495 A | 4/2017 |
| GN | 111688704 A | 9/2020 |
| GN | 112068445 A | 12/2020 |
| WO | 0181139 A1 | 11/2001 |
| WO | 2019154179 A1 | 8/2019 |

OTHER PUBLICATIONS

Xiaolin, S. et al., "An Improved RRT Algorithm of Local Path Planning for Vehicle Collision Avoidance," Journal of Hunan University, Apr. 2017, pp. 30-37, vol. 44, No. 4. [Providing Translation of Abstract Only].

Qin, Y. et al., "Integrated Crash Avoidance and Mitigation Algorithm for Autonomous Vehicles," IEEE TRansactions an Industrial Informatics, Nov. 2021, pp. 7246-7255, vol. 17, No. 11.

Ting, X. "Research on the Path Planning and the Tracking Control Algorithm of the Intelligent Vehicle in Complex Environment," "Chinese Master's Thesis Full-Text Database", "Engineering Science and Technology II", Nov. 2019, pp. 10, 15-19, 41-56.

Search Report dated Feb. 9, 2021 from Office Action for Chinese Application No. 202011009697.0 dated Feb. 22, 2021. 2 pgs.

Supplemental Search Report for Chinese Application No. 202011009697.0 dated Apr. 13, 2021. 1 pg.

* cited by examiner

METHOD AND SYSTEM FOR INTEGRATED PATH PLANNING AND PATH TRACKING CONTROL OF AUTONOMOUS VEHICLE

CROSS REFERENCE TO RELATED APPLICATION

The present application is a U.S. National entry under 35 U.S.C. § 371 of International Application No. PCT/CN2021/096615, filed May 28, 2021, which claims the benefit, and priority to a Chinese patent application No. 202011009697.0, filed Sep. 23, 2020, the disclosure of which is hereby expressly incorporated by reference herein in its entirety.

TECHNICAL FIELD

The present disclosure relates to the field of control of autonomous vehicles, and in particular, to a method and system for integrated path planning and path tracking control of autonomous vehicle.

BACKGROUND ART

Existing intelligent vehicle decision-making and control methods are often implemented by two separate modules such as path planning and path tracking. From the perspective of path planning, technical methods mostly stem from the field of robot control, and the models used are mostly vehicle envelope models based on kinematics. For intelligent vehicles under various driving conditions such as a high velocity, a large sideslip angle, and a lateral angular velocity, it is difficult to guarantee the realization of a generated path by motion planning modules. Recently, a large number of papers and inventions have been emerged to discuss path planning for intelligent vehicle systems. For example, in terms of path planning, algorithms in the conventional art, e.g., fuzzy, potential field or rapidly-exploring random tree (RRT) algorithm, are adopted to generate paths which are feasible for the vehicle to follow. However, in most of such algorithms, smooth path curves are formed in combination with perception. As a result, actual dynamic constraints (such as constraints of stability domain and road adhesion coefficient) of a vehicle are not considered effectively. Besides, such methods are limited in mobility (the result of perception is objective, but differences in dynamic constraints caused by different vehicle models cannot be reflected in the existing methods, and the proposed method can be hardly applied to different vehicle models). In addition, adjusting and tuning many parameters are often involved in path planning, which poses a greater challenge to model parameter tuning under various driving and road surface conditions.

In terms of path tracking modules, there are a variety of algorithms at present, in which a dynamic model and constraints of a vehicle are generally considered. There is no determination criterion for the rationality of a feasible path. Moreover, due to the independence of path generation as well as the difference in vehicle models, it is difficult to guarantee safe path tracking performance for the vehicle control system.

Thus, existing methods mainly focus on independent approach on path planning or path tracking and have the following major drawbacks.

1. Path planning and path tracking are handled separately, and often use different models, resulting often a generated path difficult to track (difficult to achieve).

2. In path planning by existing methods, kinematic relationships are mostly considered, and dynamic constraints for a vehicle are relatively simple. Especially, key constraints in the longitudinal and lateral directions of a vehicle, namely tire adhesion ellipses are basically not considered, and therefore, system differences under different road conditions cannot be reflected.

3. The triggering of an existing individual module control method depends on a threshold. That is, when operating of a vehicle reaches a set value, i.e., when the vehicle will collide in X seconds, the algorithm will be switched, during which there may be a risk of system instability.

Therefore, existing integrated planning and tracking algorithms belong to the category of methods based on scattered point fitting, and there are obvious boundaries between path planning and path tracking, i.e., planning first and tracking later. This approach of planning first and tracking later directly limits the response speed of an autonomous vehicle, and consequently, real-time control of the autonomous vehicle cannot be realized properly. At present, there is no method to truly integrate path planning and tracking.

SUMMARY

An objective of the present disclosure is to provide a method and system for integrated path planning and path tracking control of an autonomous vehicle to solve the problems, i.e., low response speed of an autonomous vehicle, and impossible real-time control of the autonomous vehicle, in existing control methods with planning first and tracking later for the autonomous vehicle.

To achieve the above objective, the present disclosure provides the following solutions:

A method for integrated path planning and path tracking control of an autonomous vehicle includes the following steps:

obtaining five input control variables and eleven system state variables of an autonomous vehicle at current time, where the five input control variables include a front wheel steering angle and four control torques at wheels; and the eleven system state variables comprising a lateral vehicle velocity, a yaw rate, two sideslip angles of the wheels, four relative velocities at the wheels, a horizontal coordinate of generalized vehicle coordinates, a vertical coordinate of the generalized vehicle coordinates, and a vehicle heading angle;

constructing a vehicle path planning-tracking integrated state model according to the five input control variables and the eleven system state variables at the current time;

enveloping external contours of two autonomous vehicles using elliptical envelope curves to determine elliptical vehicle envelope curves of the two autonomous vehicles, respectively;

determining time to collision (TTC) between an autonomous vehicle and a vehicle having a distance smaller than a distance threshold away from the autonomous vehicle according to the elliptical vehicle envelope curves and driving states of the vehicles;

establishing an objective function of a model prediction controller (MPC) according to the vehicle path planning-tracking integrated state model; and solving the objective function based on the TTC, and determining input control variables at next time, where the input control variables are used to increase a distance between the two autonomous vehicles with minimum control energy to control a motion trajectory of the autonomous vehicle in real time.

Optionally, the method may further include the following steps before obtaining five input control variables and eleven system state variables of the autonomous vehicle:

obtaining wheel parameters and vehicle parameters of the autonomous vehicle, wherein the wheel parameters comprise a wheel radius, a wheel rotation speed, a longitudinal wheel velocity, a longitudinal wheel force, a torque applied by an individual wheel, and wheel rotation inertia; and the vehicle parameters comprise the vehicle yaw rate and the lateral vehicle velocity;

constructing a wheel dynamic model of each wheel of the autonomous vehicle according to the wheel parameters;

constructing a vehicle dynamic model of the autonomous vehicle according to the wheel parameters and the vehicle parameters; and determining generalized vehicle coordinates of the autonomous vehicle in a geodetic coordinate system based on the dynamic models of the wheels and the dynamic model of the vehicle.

Optionally, the method may further include the following steps after constructing the vehicle path planning-tracking integrated state model according to the input control variables and the system state variables:

discretizing the vehicle path planning-tracking integrated state model to determine a discretized vehicle path planning-tracking integrated state model.

Optionally, the method may further include the following steps before determining the TTC between the autonomous vehicle and the vehicle having the distance smaller than the distance threshold away from the autonomous vehicle according to the elliptical vehicle envelope curves and the driving states of the vehicles:

solving intersection points of ellipses according to the two elliptical vehicle envelope curves; and determining a collision area between the autonomous vehicle and the vehicle having the distance smaller than the distance threshold away from the autonomous vehicle according to the intersection points of ellipses.

Optionally, the steps of determining the TTC between the autonomous vehicle and the vehicle having the distance smaller than the distance threshold away from the autonomous vehicle according to the elliptical vehicle envelope curves and the driving states of the vehicles may specifically include:

determining a mass point of each autonomous vehicle according to its elliptical vehicle envelope curve, and determining extended lines in velocity directions of two mass points;

determining a Euclidean distance between the two extended lines; and determining that a collision occurs when the Euclidean distance is smaller than the distance threshold, and obtaining the TTC between the two autonomous vehicles.

A system for integrated path planning and path tracking control of an autonomous vehicle includes:

a current-time parameter obtaining module, configured to obtain five input control variables and eleven system state variables of the autonomous vehicle at current time, wherein the five input control variables comprise a front wheel steering angle and four control moments at wheels; and the eleven system state variables comprise a lateral vehicle velocity, a yaw rate, two sideslip angles of the wheels, four relative velocities at the wheels, a horizontal coordinate of generalized vehicle coordinates, a vertical coordinate of the generalized vehicle coordinates, and a vehicle heading angle;

a vehicle path planning-tracking integrated state model constructing module, configured to construct a vehicle path planning-tracking integrated state model according to the five input control variables and the eleven system state variables at the current time;

an elliptical envelop curve determining module, configured to envelop external contours of two autonomous vehicles using elliptical envelope curves to determine elliptical vehicle envelope curves of the two autonomous vehicles, respectively;

a time to collision (TTC) determining module, configured to determine a TTC between an autonomous vehicle and a vehicle having a distance smaller than a distance threshold away from the autonomous vehicle according to the elliptical vehicle envelope curves and driving states of the vehicles;

an objective function establishing module, configured to establish an objective function of a model prediction controller (MPC) according to the vehicle path planning-tracking integrated state model; and a next-time input control variable determining module, configured to solve the objective function based on the TTC and determine input control variables at next time, wherein the input control variables are used to increase a distance between the two autonomous vehicles with minimum control energy to control a motion trajectory of the autonomous vehicle in real time.

Optionally, the system may further include:

a wheel parameter and vehicle parameter obtaining module, configured to obtain wheel parameters and vehicle parameters of the autonomous vehicle, wherein the wheel parameters comprise a wheel radius, a wheel rotation speed, a longitudinal wheel velocity, a longitudinal wheel force, a torque applied by an individual wheel, and wheel rotation inertia; and the vehicle parameters comprise the vehicle yaw rate and the lateral vehicle velocity;

a wheel dynamic model constructing module, configured to construct a wheel dynamic model of each wheel of the autonomous vehicle according to the wheel parameters;

a vehicle dynamic model constructing module, configured to construct a vehicle dynamic model of the autonomous vehicle according to the wheel parameters and the vehicle parameters; and a generalized vehicle coordinate determining module, configured to determine generalized vehicle coordinates of the autonomous vehicle in a geodetic coordinate system based on the wheel dynamic models and the vehicle dynamic model.

Optionally, the system may further include:

a discretizing module, configured to discretize the vehicle path planning-tracking integrated state model to determine a discretized vehicle path planning-tracking integrated state model.

Optionally, the TTC determining module may specifically include:

an intersection-point solving unit, configured to solve intersection points of ellipses according to the elliptical vehicle envelope curves of the two autonomous vehicles; and a TTC determining unit, configured to determine a collision area between the autonomous vehicle and the vehicle having the distance smaller than the distance threshold away from the autonomous vehicle according to the intersection points of ellipses.

Optionally, the TTC determining module may specifically include:

an extended line determining unit, configured to determine a mass point of each autonomous vehicle according to a corresponding elliptical vehicle envelope curve and determine extended lines in velocity directions of two mass points;

a Euclidean distance determining unit, configured to determine a Euclidean distance between the two extended lines; and a TTC determining unit, configured to determine that a collision occurs when the Euclidean distance is smaller than the distance threshold and obtain the TTC between the two autonomous vehicles.

According to specific embodiments of the present disclosure, the present disclosure has the following technical effects: the present disclosure provides a method and system for integrated path planning and path tracking control of an autonomous vehicle, in which a vehicle path planning-tracking integrated state model is constructed according to input control variables and system state variables of the autonomous vehicle at current time; TTC between vehicles is determined according to elliptical vehicle envelope curves; and input control variables at next time can be directly solved based on the TTC according to the vehicle path planning-tracking integrated state model and a control method. There is no requirement to use an extra path planning module to plan a path in advance. Instead, the input control variables at the next time are adjusted in real time based on the TTC, thereby achieving autonomous vehicle collision avoidance, and improving a response speed of an autonomous vehicle.

Moreover, according to the present disclosure, the problems in the conventional art are solved one by one: 1) a unified model is used herein, which is applicable to different steps with the difference in variation of an objective function, such that the difficulty of tracking of a generated path can be effectively avoided.

2) In the present disclosure, the external contours of two autonomous vehicles are enveloped based on elliptical envelope curves, and combined longitudinal and lateral slip characteristics of tires are considered and controlled, thereby reflecting system differences under different road conditions.

3) Although switching in the present disclosure depends on a set value, the switching is performed on an objective function of system control. In other words, the present disclosure is mainly characterized by integrating different objectives such as normal vehicle driving, collision avoidance and damage reduction into a complete control system, thereby realizing control of a plurality of objectives by using a single model and proving the stability of the control switching process.

Using model prediction control as a major method and considering a vehicle dynamic model with combined slip characteristics as an object, the present disclosure provides a unified dynamic control framework for different scenarios/different situations during automatic driving.

BRIEF DESCRIPTION OF THE DRAWINGS

To explain the technical solutions in embodiments of the present disclosure or in the conventional art more clearly, the accompanying drawings required in the embodiments will be briefly described below. Apparently, the accompanying drawings in the following description show merely some embodiments of the present disclosure, and other accompanying drawings may be derived from these accompanying drawings by a person of ordinary skill in the art without creative efforts.

DETAILED DESCRIPTION OF THE EMBODIMENTS

The technical solutions in the embodiments of the present disclosure will be clearly and completely described below with reference to the accompanying drawings. Apparently, the described embodiments are merely a part rather than all of the embodiments of the present disclosure. All other embodiments derived from the embodiments of the present disclosure by a person of ordinary skill in the art without creative efforts shall fall within the protection scope of the present disclosure.

An objective of the present disclosure is to provide a method and system for integrated path planning and path tracking control of an autonomous vehicle, thereby realizing autonomous vehicle collision avoidance and improving a response speed of the autonomous vehicle.

To make the above-mentioned objective, features, and advantages of the present disclosure clearer and more comprehensible, the present disclosure will be further described in detail below in conjunction with the accompanying drawings and specific embodiments.

Figure 1:
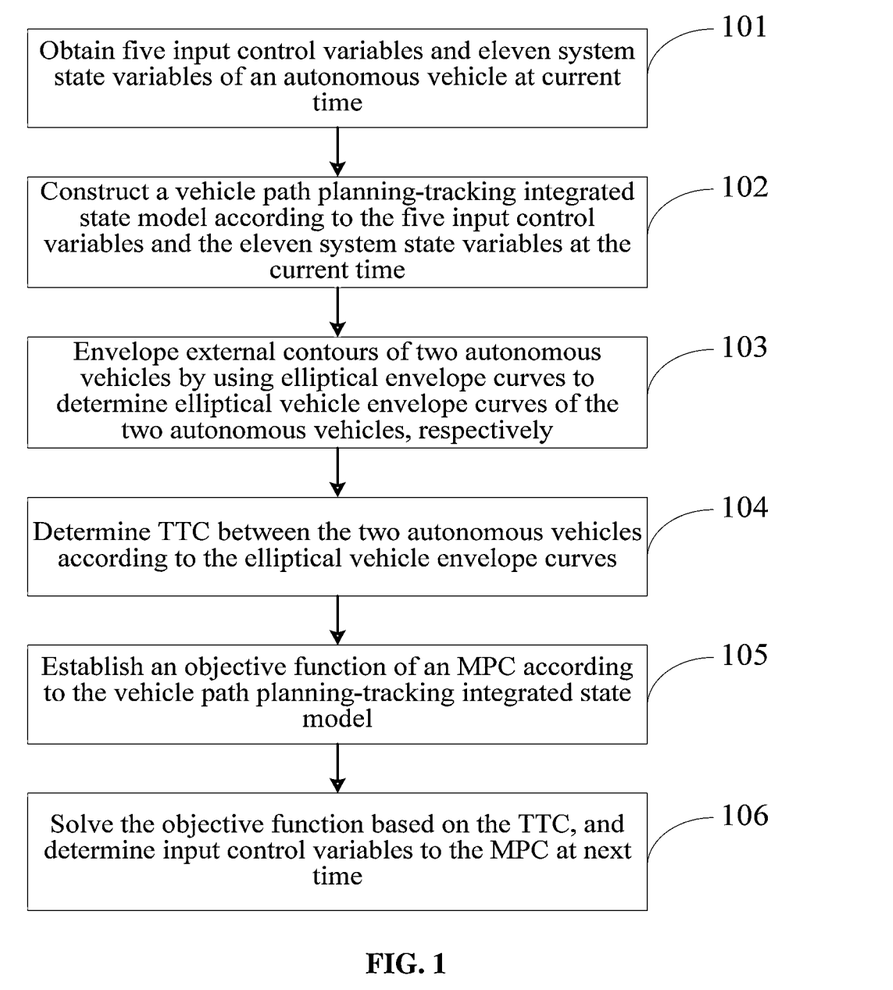
FIG. 1 is a flowchart of a method for integrated path planning and path tracking control of an autonomous vehicle provided in the present disclosure.

FIG. 1 is a flowchart of a method for integrated path planning and path tracking control of an autonomous vehicle provided in the present disclosure. As shown in FIG. 1, the method for integrated path planning and path tracking control of the autonomous vehicle includes the following steps:

Step 101: five input control variables and eleven system state variables of an autonomous vehicle at current time are obtained, where the five input control variables include a front wheel steering angle and four control moments at wheels; and the eleven system state variables include a lateral vehicle velocity, a yaw rate, two sideslip angles of the wheels, four relative velocities at the wheels, a horizontal coordinate of generalized vehicle coordinates, a vertical coordinate of the generalized vehicle coordinates, and a vehicle heading angle;

Before the Step 101, the method further includes the following steps:

Wheel parameters and vehicle parameters of the autonomous vehicle are obtained, where the wheel parameters include a wheel radius, a wheel rotation speed, a longitudinal wheel velocity, a longitudinal wheel force, a torque applied by an individual wheel, and wheel rotation inertia; and the vehicle parameters include the vehicle yaw rate and the lateral vehicle velocity.

A wheel dynamic model of each wheel of the autonomous vehicle is constructed according to the wheel parameters.

Figure 2:
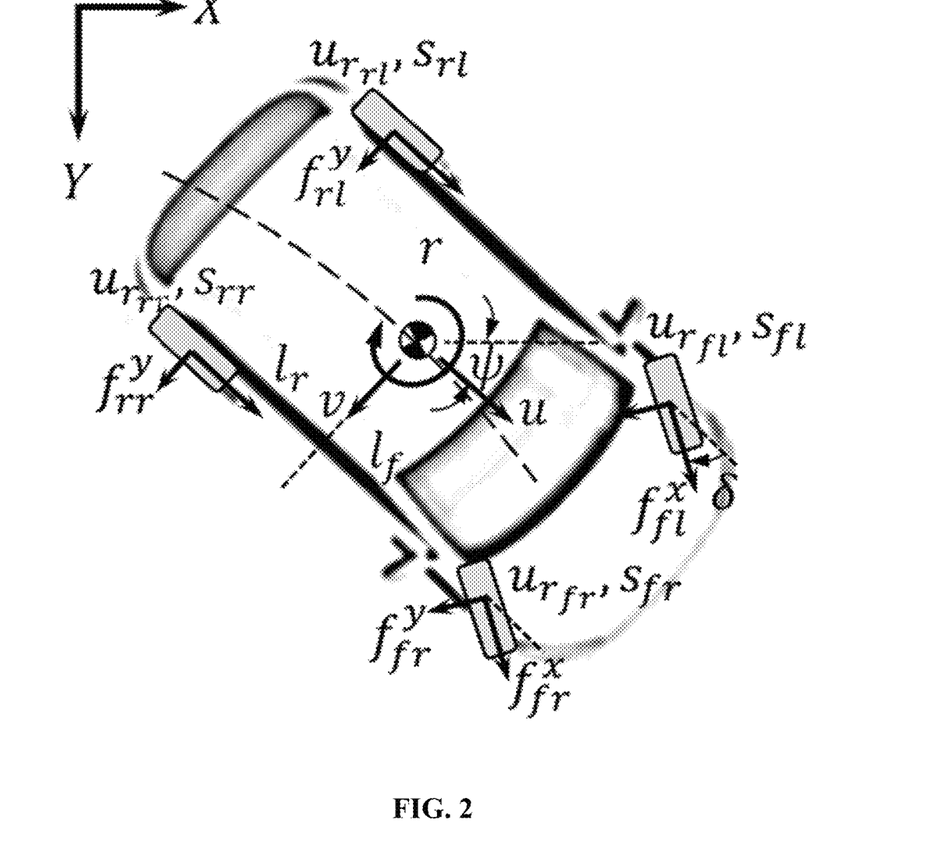
FIG. 2 is a schematic diagram of a vehicle dynamic model provided in the present disclosure.

A unified vehicle dynamic model is constructed, which will be applied to path planning and path tracking at the same time, as well as algorithms of subsequent collision avoidance and damage reduction, as shown in FIG. 2.

The dynamic model of each wheel may be described by the following formula:

$$\dot{u}_{rij} = -\frac{R^2}{I_\omega}f_{ij}^x + \frac{R}{I_\omega}T_{ij} - \dot{u}_{ij}$$

where $\dot{u}_{rij}$ represents a component of a relative slip velocity of wheel (i,j) in a longitudinal direction (u), while $\dot{u}_{ij}$ is a longitudinal acceleration mapped at each corner (at each wheel), $T_{ij}$ is a total torque on each wheel, $u_{ij}$ is a mapped velocity of a vehicle center-of-mass velocity to a wheel, i=F/R (front/rear wheel), j=L/R (left/right wheel), $u_r$=R$\omega$−$u_t$, R is a wheel radius, $\omega$ is a wheel rotation speed, $u_t$ is a longitudinal wheel velocity, and $f_{ij}^x$ is a longitudinal wheel force. It should be noted here that the wheel force may be generated by any tire dynamic model and complex dynamic behaviors of a tire can be accurately described.

A vehicle dynamic model of the autonomous vehicle is constructed according to the wheel parameters and the vehicle parameters.

The vehicle dynamic model is established, which may be expressed as follows with the yaw rate $\dot{r}$ and the lateral velocity $\dot{v}$:

$$\dot{r} = \frac{1}{I_z}\left[l_f f_f^y \cos\delta - l_r f_r^y - \frac{d_f}{2}\tilde{f}_f^y \sin\delta + \frac{d_r}{2}\tilde{f}_r^x + \left(\frac{d_f}{2}\cos\delta + l_f\sin\delta\right)f_{fl}^x + \left(-\frac{d_f}{2}\cos\delta + l_f\sin\delta\right)f_{fr}^x\right]$$

$$\dot{v} = \frac{1}{M}\left(f_f^y \cos\delta + f_r^y + f_f^x \sin\delta\right) - ru$$

where $f_*^\#$ (*=f, r, #=x, y) represents a longitudinal (lateral) force at a front (rear) wheel, while $\tilde{f}$ is a difference between tire forces on two sides in the longitudinal (lateral) direction of the front (rear) axle, and $\delta$ is a wheel steering angle.

Generalized vehicle coordinates of the autonomous vehicle in a geodetic coordinate system are determined based on the wheel dynamic models and the vehicle dynamic model.

Where, the generalized vehicle coordinates are determined by the lateral and longitudinal velocities at the center of mass of the vehicle and a heading angle. In a vehicle collision control model, the generalized coordinates are regarded as one of system states, and control input is realized in accordance with this position to avoid a collision.

Unlike existing path planning and path tracking algorithms, the present disclosure takes the coordinates of a vehicle in the geodetic coordinate system into account:

$\dot{X} = u \cos\psi - v \sin\psi$ $\dot{Y} = u \sin\psi + v \cos\psi$ where X and Y are coordinates of the center of mass of the vehicle in the geodetic coordinate system, i.e., generalized vehicle coordinates, while u is a longitudinal velocity of the center of mass, v is a value of the lateral velocity of the center of mass of the vehicle, and $\psi$ is a vehicle heading angle. To facilitate a controller to realize and solve the real-time problem, it may be locally linearized.

Step 102: a vehicle path planning-tracking integrated state model is constructed according to the five input control variables and the eleven system state variables at the current time:

$$\mathcal{H}\dot{x} = \mathcal{A}x + \mathcal{B}u + \mathcal{B}_\varrho\varrho$$

$$y = Cx;$$

where,
$H = \begin{bmatrix} m & 0 & 0 & 0 & \\ 0 & I_z & 0 & 0 & \\ -\gamma_f^v & -\gamma_f^r & 1 & 0 & 0_{4\times 7} \\ -\gamma_r^v & -\gamma_r^r & 0 & 1 & \\ & 0_{7\times 4} & & & I_{7\times 7} \end{bmatrix}$, 
$A = \begin{bmatrix} 0 & -mu & g & 0_{2\times 3} \\ 0 & 0 & & \\ & & 0_{6\times 2} & 0_{6\times 6} & 0_{6\times 3} \\ k_2 & 0 & & & k_1 \\ \bar{k}_2 & 0 & 0_{3\times 6} & 0 & \bar{k}_1 \\ 0 & 1 & & & 0 \end{bmatrix}$, $B = \begin{bmatrix} \beta_1 & \frac{s\delta}{R_e} & \frac{s\delta}{R_e} & 0 & 0 & & \\ \beta_2 & \beta_3 & \beta_4 & \frac{d_r}{2R_e} & \frac{-d_r}{2R_e} & 0 & 0 \\ & & & 0_{2\times 5} & & 0 & 0 \\ 0 & \frac{R_e}{I_\omega} & 0 & 0 & 0 & 0 \\ 0 & 0 & \frac{R_e}{I_\omega} & 0 & 0 & 0 \\ 0 & 0 & 0 & \frac{R_e}{I_\omega} & 0 & 0 \\ 0 & 0 & 0 & 0 & \frac{R_e}{I_\omega} & 0 & 0 \\ & & & 0_{3\times 5} & & & \end{bmatrix}$, and $C = \begin{bmatrix} I_{2\times 2} & 0_{2\times 9} \\ 0_{3\times 8} & I_{3\times 3} \end{bmatrix}$.

The front wheel steering angle and the four control moments at wheels are selected as system control input u=[$\delta$ $T_{fl}$ $T_{fr}$ $T_{rl}$ $T_{rr}$], and different control input combinations are adopted to achieve the same objective.

System state variables are defined as x=[v r $\tau_f$ $\tau_r$ $u_r$ X Y $\psi$], namely a lateral vehicle velocity v, a yaw rate r, wheel sideslip angles ($\tau_f$ is a front wheel sideslip angle, and $\tau_r$ is a rear wheel sideslip angle), relative velocities $u_r$ at wheels (specifically including mapped velocities $\dot{u}_{ij}$ of four wheels), generalized vehicle coordinates (X,Y), and a vehicle heading angle $\psi$. In the above formulas, $\dot{x}$ is a first-order differential of the system state variables, while y is a system output variable, $\mathcal{B}$ is an uncontrolled system input coefficient matrix, $\varrho$ is an uncontrolled system input state, m is a total vehicle mass, $I_z$ is rotation inertia of a vehicle body around the center of mass and perpendicular to the ground axis (z-axis), $\gamma_f^v$ is a partial derivative $$\frac{\partial \tau_f}{\partial v}$$

of the front wheel sideslip angle to the lateral velocity, $\gamma_f^r$ is a partial derivative $$\frac{\partial \tau_f}{\partial r}$$

of the front wheel sideslip angle to the yaw rate, $\gamma_r^v$ is a partial derivative $$\frac{\partial \tau_r}{\partial v}$$

of the rear wheel sideslip angle to the lateral velocity, $\gamma_r^v$ is a partial derivative $$\frac{\partial \tau_f}{\partial v}$$

of the rear wheel sideslip angle to the yaw rate, $I_{7\times7}$ is a 7×7 unit matrix, u is the longitudinal velocity of the center of mass, k1 and k2 are parameters of a conversion function, $\beta_1$, $\beta_2$, $\beta_3$ and $\beta_4$ are vehicle kinematic parameters in a system input matrix B, s is a sideslip angle of the center of mass of the vehicle, $\delta$ is a front wheel steering angle of the vehicle, Re is a wheel rolling radius, dr is a distance between the rear axle and the center of mass of the vehicle, $I_{2\times2}$ is a 2×2 unit matrix, $I_{3\times3}$ is a 3×3 unit matrix, $T_{fl}$ is a torque applied by the left front wheel, $T_{fr}$ is a torque applied by the right front wheel, $T_{rl}$ is a torque applied by the left rear wheel, and $T_{rr}$ is a torque applied by the right rear wheel.

The system output includes the vehicle sideslip angle, the yaw rate, and the generalized vehicle coordinates. The core of the path planning-tracking integrated algorithm provided in the present disclosure relies on considering and controlling the generalized vehicle coordinates in the system state, and completely decoupling the system state by defining wheel sideslip angle variables and relative velocities of wheels and locally linearizing the generalized vehicle coordinates.

To realize system control, the system is further discretized:

$$x(k+1) = \mathcal{A}_d x(k) = B_d u(k) = \beta_\varrho Q(k)$$

$$y(k) = C_d x(k)$$

where a subscript d means discretization of the corresponding letter, and k denotes discrete time.

Based on the discretized vehicle path planning-tracking integrated state model, a unified MPC is constructed depending on an activation condition of a TTC determination algorithm in the present disclosure to solve a constraint optimization problem. The control objective of integrated path planning and tracking is achieved by comparing the TTC with a time threshold to determine whether an objective function is switched and generating a control signal of an actuator of the vehicle.

The path planning and tracking of an intelligent vehicle require triggering conditions, such as vehicle steering, existence of an obstacle, and a dynamic behavior(s) of a surrounding vehicle(s).

Taking a scenario induced by a dynamic behavior of a surrounding vehicle for example, TTC, namely time to collision, is defined first. Some active behaviors such as steering may not be calculated depending on TTC, but subsequent steps can still be included into the claimed scope of the present disclosure.

Before calculating TTC, a vehicle collision point needs to be defined first, and the TTC may be calculated according to this point and a current vehicle speed.

Step 103: external contours of two autonomous vehicles are enveloped by using elliptical envelope curves to determine elliptical vehicle envelope curves of the two autonomous vehicles, respectively.

Figure 3:
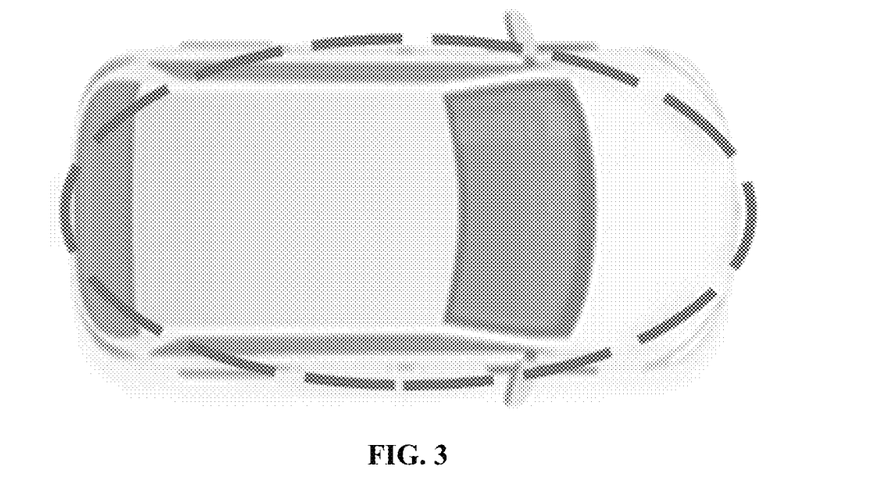
FIG. 3 is a chart of an elliptical vehicle envelope curve provided in the present disclosure.

The external contour of the vehicle is enveloped by using an ellipse. FIG. 3 is a chart of elliptical vehicle envelope curves provided in the present disclosure. As shown in FIG. 3, unlike circular, square, double circular envelops and the like adopted in existing papers, elliptical envelope curves used in the present disclosure may conform to actual vehicle characteristics better.

A distribution diagram of vehicles surrounding the present vehicle may be plotted according to such information as center of mass and lengths of long and short axes of each surrounding vehicle, with each vehicle being represented by an elliptical envelope curve, where a vehicle width is twice the length of the short axis and a vehicle length is twice the length of the long axis. The speed and heading information of the surrounding vehicles are obtained by means of Internet of vehicles and advanced perceptive technology. In a condition of defining current time t and a time interval T, vehicle positions are predicted in future time series [t+T t+2T . . . t+nT] according to the driving states of current surrounding vehicles, i.e., the speed and heading information of the surrounding vehicles.

Step 104: TTC between the autonomous vehicle and a vehicle having a distance smaller than a distance threshold away from the autonomous vehicle is determined according to the elliptical vehicle envelope curves and driving states of the vehicles.

The distance between vehicles is calculated at each time interval T. Whether a collision will occur may be determined by using the following two methods according to the calculation capability of a vehicle-mounted computer:

Method 1: intersection points of different ellipses are solved according to the elliptical envelope curves of vehicles.

Method 2: a Euclidean distance between extended lines of different trajectories is calculated, and if the Euclidean distance is smaller than a distance threshold $S_c$, it is determined that a collision may occur. The extended line extends in a velocity direction of a center-of-mass.

When the result of determination by using one of the above two methods is that a collision may occur, it may be obtained that TTC=t+nT, where T is the time interval for calculation defined by a user, for example, 5 ms; and n denotes the number of T, which is a positive integer. For example, if the collision will occur in 1 second, a calculated result is to be 200T. Here, time to collision $t_c$ may be defined. When TTC<$t_c$, the path planning-tracking algorithm is activated. A setting of $t_c$ is mainly considered to avoid unnecessary vehicle behaviors caused by frequent activation of the vehicle actuating system, thereby reducing driving comfort.

Step 105: an objective function of a model prediction controller (MPC) is established according to the vehicle path planning-tracking integrated state model.

A system MPC planning-controller is built according to vehicle dynamic characteristics, i.e., various vehicle parameters in the vehicle dynamic model. The objective function of the MPC planning-controller is defined as follows:

$$J = \frac{1}{2}[Q \cdot \exp(-s_p) + (u_p - u_p^-)^T H(u_p - u_p^-) + u_p^T M u_p], p=1, \ldots N_p$$

where $S_p$ represents a distance between the position of the center-of-mass of the present vehicle and that of a neighboring vehicle at time p, while $u_p$ is a control input at time p, $u_p^-$ is a control input at previous time, Q, H and M represent a relative distance between vehicles, smoothness of the control input and a weight matrix of the control input, respectively, and $N_p$ is a predicted time domain length of the MPC.

Step 106: the objective function is solved based on the TTC, and input control variables of the MPC at the next time are determined, where the input control variables are used to increase a distance between two autonomous vehicles with minimum control energy to control a motion trajectory of each autonomous vehicle in real time.

The MPC problem may be concluded as follows based on the above objective function:

$$u^* = \mathrm{argmin}\, J$$

subject to $x(k+1) = \mathcal{A}_d x(k) + \mathcal{B}_d u(k) + \mathcal{B}_\varrho \varrho(k);$ $$\underline{u} \le u_p \le \overline{u};$$

$$D|x_k| \le E + s_k,\, s_k \ge 0$$

where u* represents the calculated control input, and constraints include a system state constraint, upper and lower limits of the control input, and a system state stability domain. The MPC problem can be solved to obtain the system input control variables at the next time, such that the distance between two vehicles may be maximized, the input may be as small as possible and a change rate of the input may be as low as possible, thereby reducing power consumption.

According to the objective function of the MPC, the MPC planning-controller can achieve a maximum distance away from a neighboring vehicle by adjusting the output of a system actuator with the consideration of the system input and dynamic constraints, thereby achieving synchronous path planning and path tracking. As can be seen, compared with relatively independent existing path planning and path tracking methods, the proposed algorithm may achieve synchronous control of planning and tracking by using a single controller.

The present disclosure can cover future vehicle driving states, and the updating performed at each control interval guarantees the vehicle state used in the algorithm is consistent with the actual state.

Figure 4:
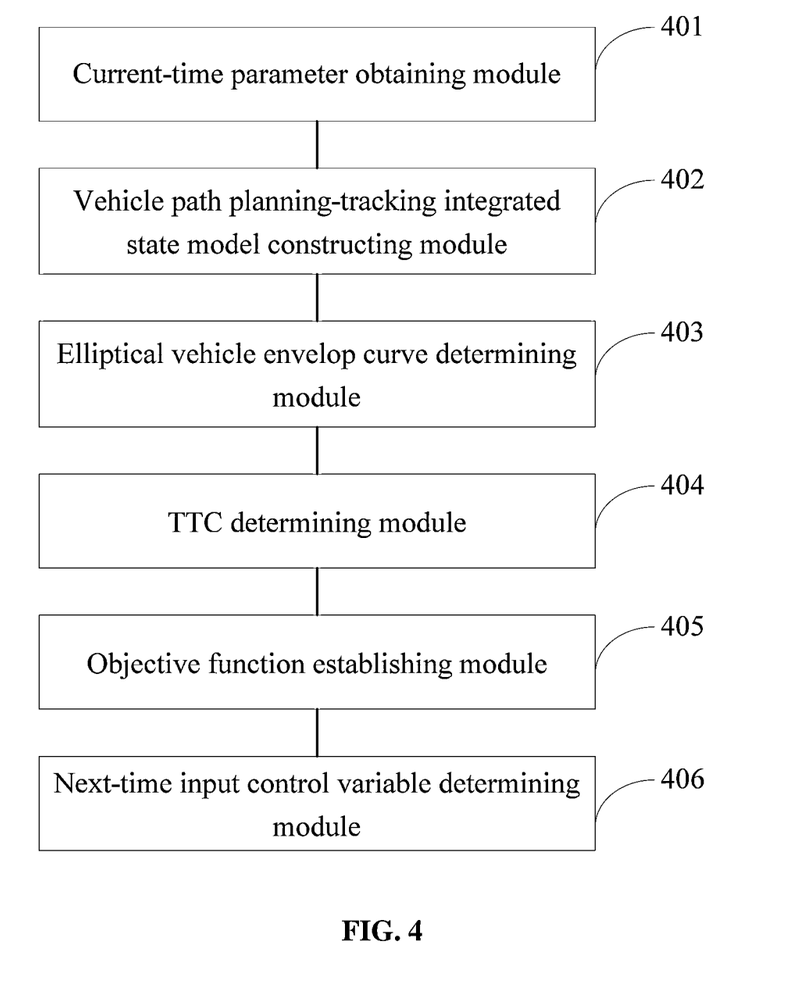
FIG. 4 is a structure diagram of a system for integrated path planning and path tracking control of an autonomous vehicle provided in the present disclosure.

FIG. 4 is a structure diagram of a system for integrated path planning and path tracking control of an autonomous vehicle provided in the present disclosure. As shown in FIG. 4, the system for the integrated path planning and path tracking control of the autonomous vehicle includes:

a current-time parameter obtaining module 401, configured to obtain five input control variables and eleven system state variables of an autonomous vehicle at current time, where the five input control variables include a front wheel steering angle and four control moments at wheels; and the eleven system state variables include a lateral vehicle velocity, a yaw rate, two sideslip angles of the wheels, four relative velocities at wheels, a horizontal coordinate of generalized vehicle coordinates, a vertical coordinate of the generalized vehicle coordinates, and a vehicle heading angle;

a vehicle path planning-tracking integrated state model constructing module 402, configured to construct a vehicle path planning-tracking integrated state model according to the five input control variables and the eleven system state variables at the current time;

an elliptical vehicle envelop curve determining module 403, configured to envelop external contours of two autonomous vehicles by using elliptical envelope curves to determine elliptical vehicle envelope curves of the two autonomous vehicles, respectively;

a TTC determining module 404, configured to determine the TTC between the autonomous vehicle and a vehicle having a distance smaller than a distance threshold away from the autonomous vehicle according to the elliptical vehicle envelope curves and driving states of the vehicles;

an objective function establishing module 405, configured to establish an objective function of an MPC according to the vehicle path planning-tracking integrated state model; and a next-time input control variable determining module 406, configured to solve the objective function based on the TTC and determine input control variables at the next time, where the input control variables are used to increase a distance between two autonomous vehicles with minimum control energy to control a motion trajectory of the autonomous vehicle in real time.

The system further includes: a wheel parameter and vehicle parameter obtaining module configured to obtain wheel parameters and vehicle parameters of the autonomous vehicle, where the wheel parameters include a wheel radius, a wheel rotation speed, a longitudinal wheel velocity, a longitudinal wheel force, a torque applied by an individual wheel, and wheel rotation inertia, and the vehicle parameters include the vehicle yaw rate and the lateral vehicle velocity; a wheel dynamic model constructing module configured to construct a wheel dynamic model of each wheel of the autonomous vehicle according to the wheel parameters; a vehicle dynamic model constructing module configured to construct a vehicle dynamic model of the autonomous vehicle according to the wheel parameters and the vehicle parameters; and a generalized vehicle coordinate determining module configured to determine generalized vehicle coordinates of the autonomous vehicle in a geodetic coordinate system based on the wheel dynamic models and the vehicle dynamic model.

The system further includes: a discretizing module configured to discretize the vehicle path planning-tracking integrated state model to determine a discretized vehicle path planning-tracking integrated state model.

The TTC determining module 404 in the present disclosure specifically includes: a intersection-point solving unit configured to solve intersection points of ellipses according to the elliptical vehicle envelope curves of the two autonomous vehicles; and a TTC determining unit configured to determine a collision area between the autonomous vehicle and the vehicle having the distance smaller than the distance threshold away from the autonomous vehicle according to the intersection points of ellipses.

The TTC determining module 404 specifically includes: an extended line determining unit configured to determine a mass point of each autonomous vehicle according to the corresponding elliptical vehicle envelope curve and determine extended lines in velocity directions of two mass points; a Euclidean distance determining unit configured to determine a Euclidean distance between the two extended lines; and a TTC determining unit configured to determine that a collision occurs when the Euclidean distance is smaller than the distance threshold and obtain the TTC between the two autonomous vehicles.

According to the present disclosure, with the consideration of vehicle dynamic characteristics and constraints, autonomous switching of the vehicle collision avoidance function can be achieved autonomously by means of coordination control on vehicle actuating submodules, such as braking, steering and driving, with no need for an additional path planning module.

The embodiments are described herein in a progressive manner. Each embodiment focuses on the difference from other embodiment, and the same and similar parts between the embodiments may refer to each other. Since the system disclosed in the embodiments corresponds to the method disclosed in the embodiments, the description is relatively simple, and reference can be made to the method description.

Specific examples are used herein to explain the principles and embodiments of the disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of this specification shall not be construed as a limitation to the present disclosure.

What is claimed is:

1. A method for integrated path planning and path tracking control of an autonomous vehicle, comprising:
acquiring five input control variables and eleven system state variables of an autonomous vehicle at current time, wherein the five input control variables comprise a front wheel steering angle and four control moments at wheels; and the eleven system state variables comprise a lateral vehicle velocity, a yaw rate, four sideslip angles of the wheels, two relative velocities at the wheels, a horizontal coordinate of generalized vehicle coordinates, a vertical coordinate of the generalized vehicle coordinates, and a vehicle heading angle; and
constructing a vehicle path planning-tracking integrated state model according to the five input control variables and the eleven system state variables at the current time:

$$\mathcal{H}\dot{x} = \mathcal{A}x + \mathcal{B}u + \beta_Q Q$$

$$y = \mathcal{C}x,$$

wherein, $$H = \begin{bmatrix} m & 0 & 0 & 0 \\ 0 & I_z & 0 & 0 \\ -\gamma_f^v & -\gamma_f^r & 1 & 0 & 0_{4\times 7} \\ -\gamma_r^v & -\gamma_r^r & 0 & 1 \\ & 0_{7\times 4} & & & I_{7\times 7} \end{bmatrix}, A = \begin{bmatrix} 0 & -mu & g & 0_{2\times 3} \\ 0 & 0 & & \\ & & 0_{6\times 2} & 0_{6\times 6} & 0_{6\times 3} \\ k_2 & 0 & & & k_1 \\ \bar{k}_2 & 0 & 0_{3\times 6} & 0 & \bar{k}_1 \\ 0 & 1 & & & 0 \end{bmatrix},$$

$$B = \begin{bmatrix} \beta_1 & \frac{s\delta}{R_e} & \frac{s\delta}{R_e} & 0 & 0 \\ \beta_2 & \beta_3 & \beta_4 & \frac{d_r}{2R_e} & \frac{-d_r}{2R_e} & 0 & 0 \\ & & & 0_{2\times 5} & & 0 & 0 \\ 0 & \frac{R_e}{I_\omega} & 0 & 0 & 0 & 0 \\ 0 & 0 & \frac{R_e}{I_\omega} & 0 & 0 & 0 & 0 \\ 0 & 0 & 0 & \frac{R_e}{I_\omega} & 0 & 0 & 0 \\ 0 & 0 & 0 & 0 & \frac{R_e}{I_\omega} & 0 & 0 \\ & & & 0_{3\times 5} & & & \end{bmatrix}, \text{ and } C = \begin{bmatrix} I_{2\times 2} & 0_{2\times 9} \\ 0_{3\times 8} & I_{3\times 3} \end{bmatrix}$$

wherein, the front wheel steering angle and the four control moments at wheels are selected as a system control input $u=[\delta\ T_{fl}\ T_{fr}\ T_{rl}\ T_{rr}]$, and different control input combinations are adopted to achieve a same objective; system state variables are defined as $x=[v\ r\ \tau_f\ \tau_r\ u_r\ X\ Y\ \psi]$, including a lateral vehicle velocity v, a yaw rate r, wheel sideslip angles, relative velocities $u_r$ at wheels specifically including mapped velocities $\dot{u}_{ij}$ of four wheels, generalized vehicle coordinates (X,Y), and a vehicle heading angle $\Psi$, wherein $\tau_f$ is a front wheel sideslip angle, and $\tau_r$ is a rear wheel sideslip angle;
enveloping external contours of two autonomous vehicles using elliptical envelope curves to determine elliptical vehicle envelope curves of the two autonomous vehicles, respectively;
determining time to collision (TTC) between an autonomous vehicle and a vehicle having a distance smaller than a distance threshold away from the autonomous vehicle according to the elliptical vehicle envelope curves and driving states of the vehicles;
establishing an objective function of a model prediction controller (MPC) according to the vehicle path planning-tracking integrated state model, wherein, a system MPC planning-controller is built according to vehicle dynamic characteristics including various vehicle parameters in the vehicle dynamic model, and an objective function of the MPC planning-controller is defined as follows:

$$J = \tfrac{1}{2}[Q \cdot \exp(-s_p) + (u_p - u_p^-)^T H(u_p - u_p^-) + u_p^T M u_p], p=1, \ldots N_p$$

wherein $s_p$ represents a distance between a position of a center-of-mass of a present vehicle and that of a neighboring vehicle at time p, $u_p$ is a control input at time p, $u_p^-$ is a control input at previous time, Q, H and M represent a relative distance between vehicles, smoothness of the control input and a weight matrix of the control input, respectively, and $N_p$ is a predicted time domain length of the MPC; and
solving the objective function based on the TTC, and determining input control variables at next time, wherein the input control variables are used to increase a distance between the two autonomous vehicles with minimum control energy to control a motion trajectory of the autonomous vehicle in real time.

2. The method for the integrated path planning and path tracking control of the autonomous vehicle according to claim 1, wherein, before obtaining the five input control variables and the eleven system state variables of the autonomous vehicle, the method further comprises:
obtaining wheel parameters and vehicle parameters of the autonomous vehicle, wherein the wheel parameters comprise a wheel radius, a wheel rotation speed, a longitudinal wheel velocity, a longitudinal wheel force, a torque applied by an individual wheel, and wheel rotation inertia; and the vehicle parameters comprise the vehicle yaw rate and the lateral vehicle velocity;
constructing a wheel dynamic model of each wheel of the autonomous vehicle according to the wheel parameters;
constructing a vehicle dynamic model of the autonomous vehicle according to the wheel parameters and the vehicle parameters; and
determining generalized vehicle coordinates of the autonomous vehicle in a geodetic coordinate system based on the dynamic models of the wheels and the dynamic model of the vehicle.

3. The method for the integrated path planning and path tracking control of the autonomous vehicle according to claim 1, wherein, after constructing the vehicle path planning-tracking integrated state model according to the input control variables and the system state variables, the method further comprises:
discretizing the vehicle path planning-tracking integrated state model to determine a discretized vehicle path planning-tracking integrated state model.

4. The method for the integrated path planning and path tracking control of the autonomous vehicle according to claim 1, wherein, before determining the TTC between the autonomous vehicle and the vehicle having the distance smaller than the distance threshold away from the autonomous vehicle according to the elliptical vehicle envelope curves and the driving states of the vehicles:

solving intersection points of ellipses according to the two elliptical vehicle envelope curves; and determining a collision area between the autonomous vehicle and the vehicle having the distance smaller than the distance threshold away from the autonomous vehicle according to the intersection points of ellipses.

5. The method for the integrated path planning and path tracking control of the autonomous vehicle according to claim 1, wherein determining the TTC between the autonomous vehicle and the vehicle having the distance smaller than the distance threshold away from the autonomous vehicle according to the elliptical vehicle envelope curves and the driving states of the vehicles comprises:

determining a mass point of each autonomous vehicle according to a corresponding elliptical vehicle envelope curve, and determining extended lines in velocity directions of two mass points;

determining a Euclidean distance between the two extended lines; and determining that a collision occurs when the Euclidean distance is smaller than the distance threshold, and obtaining the TTC between the two autonomous vehicles.

6. A system for integrated path planning and path tracking control of an autonomous vehicle, comprising:

a current-time parameter obtaining module, configured to obtain five input control variables and eleven system state variables of the autonomous vehicle at current time, wherein the five input control variables comprise a front wheel steering angle and four control moments at wheels; and the eleven system state variables comprise a lateral vehicle velocity, a yaw rate, four sideslip angles of the wheels, two relative velocities at the wheels, a horizontal coordinate of generalized vehicle coordinates, a vertical coordinate of the generalized vehicle coordinates, and a vehicle heading angle;

a vehicle path planning-tracking integrated state model constructing module, configured to construct a vehicle path planning-tracking integrated state model according to the five input control variables and the eleven system state variables at the current time:

$$\mathcal{H}\dot{x} = \mathcal{A}x + \mathcal{B}u + \beta_\varrho \varrho$$

$$y = \mathcal{C}x,$$

wherein, $$H = \begin{bmatrix} m & 0 & 0 & 0 & & \\ 0 & I_z & 0 & 0 & & \\ -\gamma_f^v & -\gamma_f^r & 1 & 0 & 0_{4\times 7} & \\ -\gamma_r^v & -\gamma_r^r & 0 & 1 & & \\ & 0_{7\times 4} & & & I_{7\times 7} & \end{bmatrix}, A = \begin{bmatrix} 0 & -mu & g & 0_{2\times 3} \\ 0 & 0 & & \\ & & 0_{6\times 2} & 0_{6\times 6} & 0_{6\times 3} \\ k_2 & 0 & & & k_1 \\ \bar{k}_2 & 0 & & 0_{3\times 6} & 0 & \bar{k}_1 \\ 0 & 1 & & & 0 \end{bmatrix},$$

-continued $$B = \begin{bmatrix} \beta_1 & \frac{s\delta}{R_e} & \frac{s\delta}{R_e} & 0 & 0 & & \\ \beta_2 & \beta_3 & \beta_4 & \frac{d_r}{2R_e} & \frac{-d_r}{2R_e} & 0 & 0 \\ & & 0_{2\times 5} & & & 0 & 0 \\ 0 & \frac{R_e}{I_\omega} & 0 & 0 & 0 & 0 & 0 \\ 0 & 0 & \frac{R_e}{I_\omega} & 0 & 0 & 0 & 0 \\ 0 & 0 & 0 & \frac{R_e}{I_\omega} & 0 & 0 & 0 \\ 0 & 0 & 0 & 0 & \frac{R_e}{I_\omega} & 0 & 0 \\ & & 0_{3\times 5} & & & & \end{bmatrix}, \text{ and } C = \begin{bmatrix} I_{2\times 2} & 0_{2\times 9} \\ 0_{3\times 8} & I_{3\times 3} \end{bmatrix}$$

wherein, the front wheel steering angle and the four control moments at wheels are selected as a system control input u=[δ $T_{fl}$ $T_{fr}$ $T_{rl}$ $T_{rr}$], and different control input combinations are adopted to achieve a same objective; system state variables are defined as x=[v r $\tau_f$ $\tau_r$ $u_r$ X Y ψ], including a lateral vehicle velocity v, a yaw rate r, wheel sideslip angles, relative velocities $u_r$ at wheels specifically including mapped velocities $\dot{u}_{ij}$ of four wheels, generalized vehicle coordinates (X,Y), and a vehicle heading angle Ψ, wherein $\tau^f$ is a front wheel sideslip angle, and $\tau_r$ is a rear wheel sideslip angle;

an elliptical envelop curve determining module, configured to envelop external contours of two autonomous vehicles using elliptical envelope curves to determine elliptical vehicle envelope curves of the two autonomous vehicles, respectively;

a time to collision (TTC) determining module, configured to determine a TTC between an autonomous vehicle and a vehicle having a distance smaller than a distance threshold away from the autonomous vehicle according to the elliptical vehicle envelope curves and driving states of the vehicles;

an objective function establishing module, configured to establish an objective function of a model prediction controller (MPC) according to the vehicle path planning-tracking integrated state model, wherein, a system MPC planning-controller is built according to vehicle dynamic characteristics including various vehicle parameters in the vehicle dynamic model, and an objective function of the MPC planning-controller is defined as follows:

$$J = \frac{1}{2}[Q \cdot \exp(-s_p) + (u_p - u_p^-)^T H(u_p - u_p^-) + u_p^T M u_p], p=1, \ldots N_p$$

wherein $s_p$ represents a distance between a position of a center-of-mass of a present vehicle and that of a neighboring vehicle at time p, $u_p$ is a control input at time p, $u_p^-$ is a control input at previous time, Q, H and M represent a relative distance between vehicles, smoothness of the control input and a weight matrix of the control input, respectively, and $N_p$ is a predicted time domain length of the MPC; and a next-time input control variable determining module, configured to solve the objective function based on the TTC and determine input control variables at next time, wherein the input control variables are used to increase a distance between the two autonomous vehicles with minimum control energy to control a motion trajectory of the autonomous vehicle in real time.

7. The system for the integrated path planning and path tracking control of the autonomous vehicle according to claim 6, wherein the system further comprises:
- a wheel parameter and vehicle parameter obtaining module, configured to obtain wheel parameters and vehicle parameters of the autonomous vehicle, wherein the wheel parameters comprise a wheel radius, a wheel rotation speed, a longitudinal wheel velocity, a longitudinal wheel force, a torque applied by an individual wheel, and wheel rotation inertia; and the vehicle parameters comprise the vehicle yaw rate and the lateral vehicle velocity;
- a wheel dynamic model constructing module, configured to construct a wheel dynamic model of each wheel of the autonomous vehicle according to the wheel parameters;
- a vehicle dynamic model constructing module, configured to construct a vehicle dynamic model of the autonomous vehicle according to the wheel parameters and the vehicle parameters; and
- a generalized vehicle coordinate determining module, configured to determine generalized vehicle coordinates of the autonomous vehicle in a geodetic coordinate system based on the wheel dynamic models and the vehicle dynamic model.

8. The system for the integrated path planning and path tracking control of the autonomous vehicle according to claim 6, wherein the system further comprises:
- a discretizing module, configured to discretize the vehicle path planning-tracking integrated state model to determine a discretized vehicle path planning-tracking integrated state model.

9. The system for the integrated path planning and path tracking control of the autonomous vehicle according to claim 6, wherein the TTC determining module comprises:
- an intersection-point solving unit, configured to solve intersection points of ellipses according to the elliptical vehicle envelope curves of the two autonomous vehicles; and
- a TTC determining unit, configured to determine a collision area between the autonomous vehicle and the vehicle having the distance smaller than the distance threshold away from the autonomous vehicle according to the intersection points of ellipses.

10. The system for the integrated path planning and path tracking control of the autonomous vehicle according to claim 6, wherein the TTC determining module comprises:
- an extended line determining unit, configured to determine a mass point of each autonomous vehicle according to a corresponding elliptical vehicle envelope curve and determine extended lines in velocity directions of two mass points;
- a Euclidean distance determining unit, configured to determine a Euclidean distance between the two extended lines; and
- a TTC determining unit, configured to determine that a collision occurs when the Euclidean distance is smaller than the distance threshold and obtain the TTC between the two autonomous vehicles.

\* \* \* \* \*